April 4, 1950 C. W. YANT 2,502,689
RETRACTABLE GATE VALVE
Filed Aug. 17, 1944 4 Sheets-Sheet 3
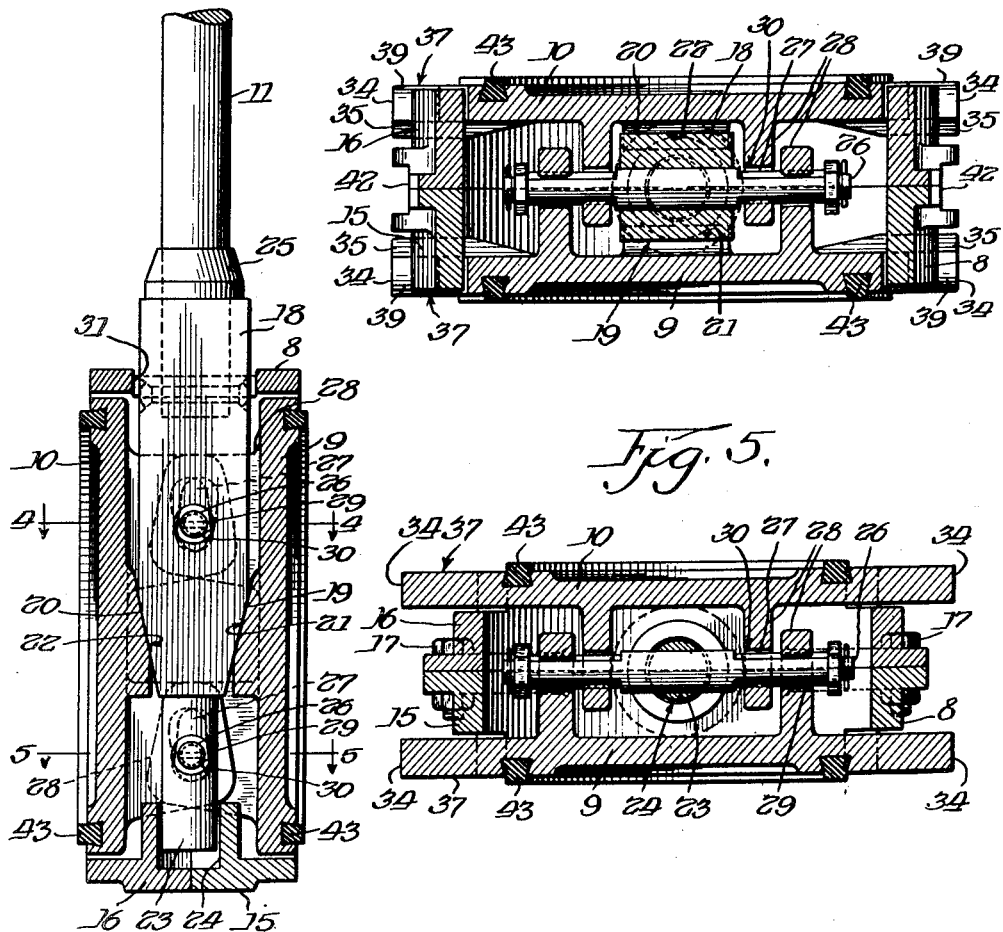
Inventor:
Chester W. Yant
By: Joseph O. Lange
Atty.

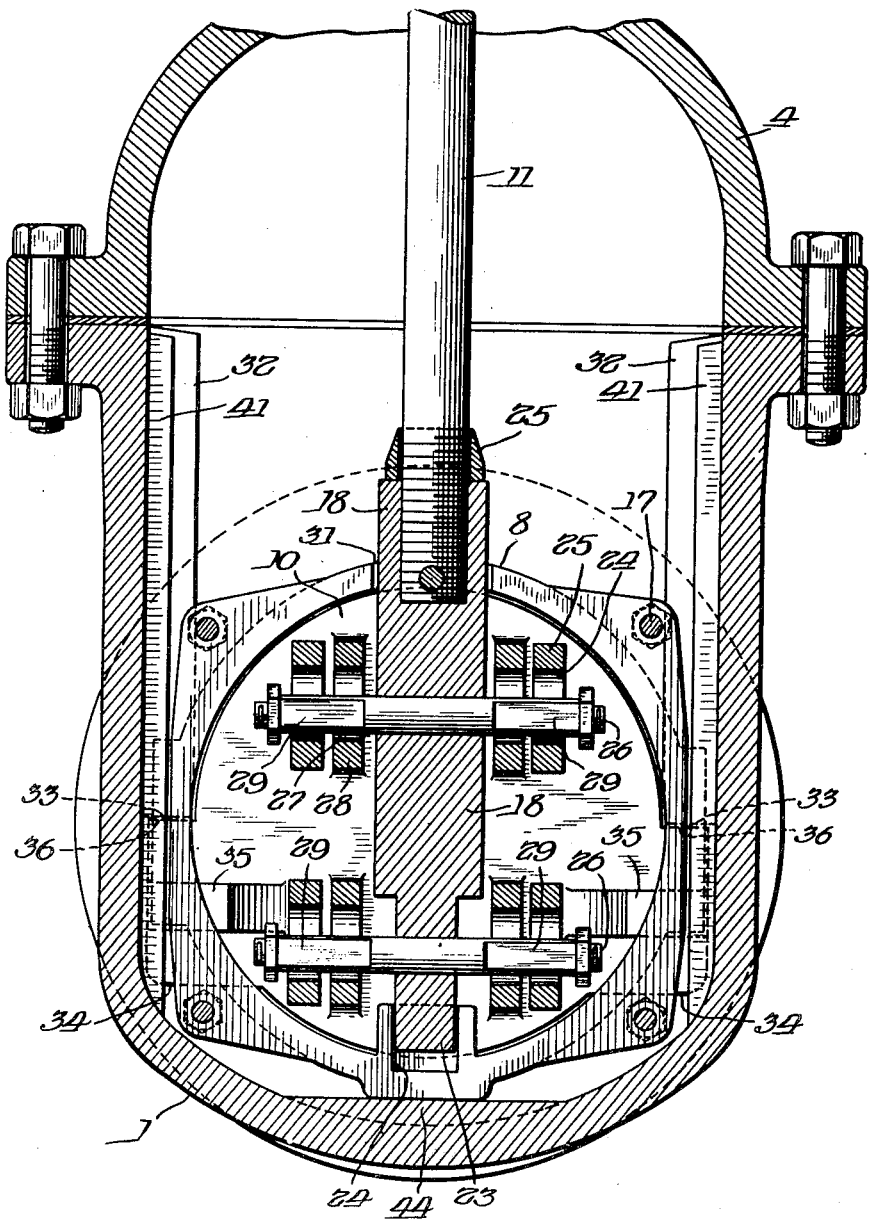

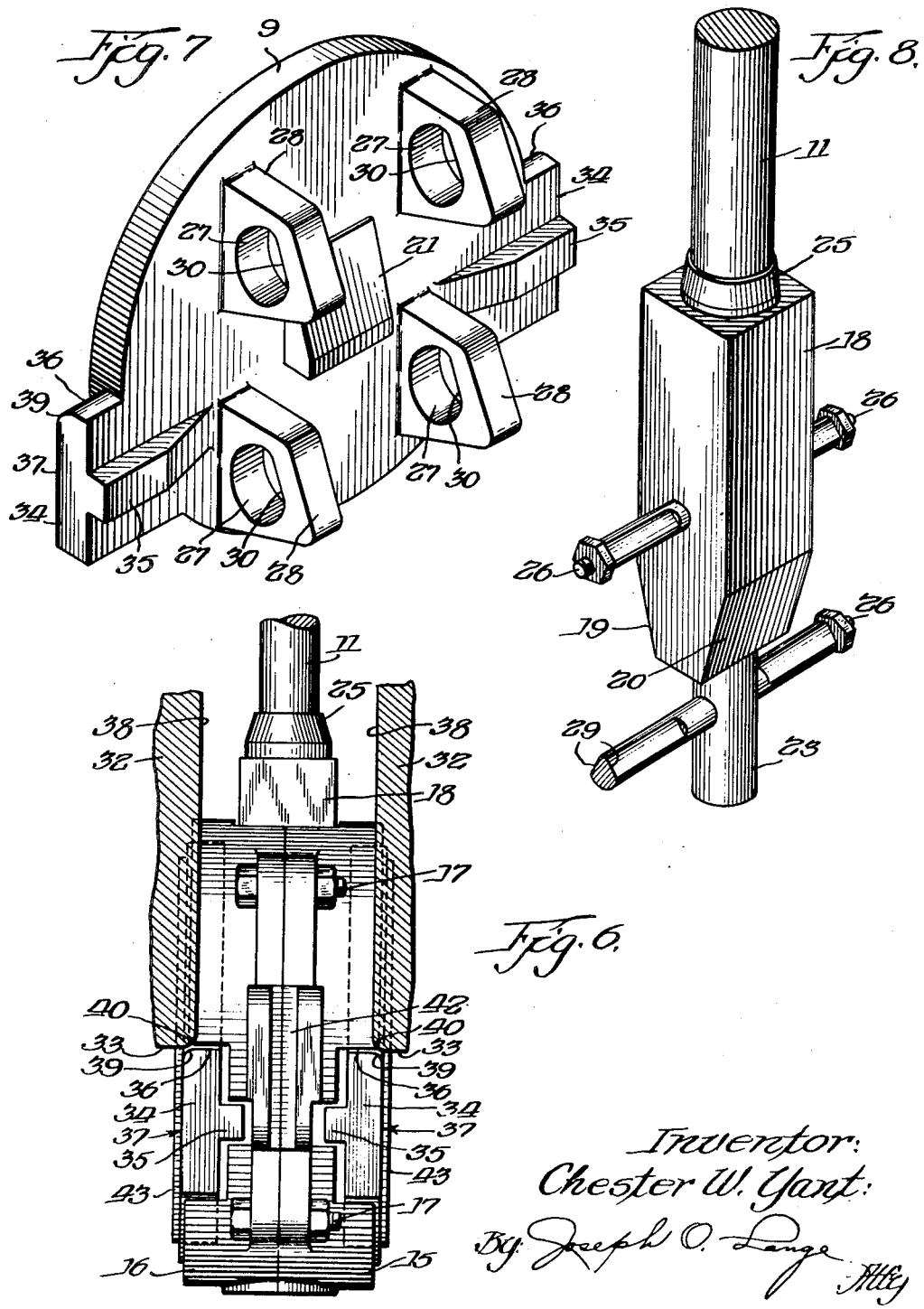

Patented Apr. 4, 1950

2,502,689

UNITED STATES PATENT OFFICE 2,502,689

RETRACTABLE GATE VALVE

Chester W. Yant, Westchester, Ill., assignor to Crane Co., Chicago, Ill., a corporation of Illinois Application August 17, 1944, Serial No. 549,878

5 Claims. (Cl. 251—70)

This invention relates to gate valves and more particularly it pertains to the type of valve known to those skilled in the art as retractable double disc gate valves. In more detailed explanations of my contribution to the art, beginning with the closed position of the valve, the initial movement of the valve operating mechanism causes the closure member seating parts or discs to recede from the seating surfaces in a direction substantially perpendicular thereto, and thereafter when the discs are no longer in contact with the seats the entire closure member assembly is moved in a direction substantially parallel to the seating surfaces until it is completely out of the path of fluid flow through the valve. The closing of the valve comprises the same movements of the closure member and discs but in the reverse order and direction of motion.

One of the more important objects of my invention lies in the provision of a valve in which the discs are capable of reciprocating movement normal to the seating surfaces whereby there is no rubbing or dragging of the discs across the seats thereby eliminating scoring, abrasion or galling of the seating surfaces.

Another important object of my invention is to provide a valve in which the closure member assembly comprising the discs, the wedging and retracting mechanisms and a suitable lifting device are contained as a unit in a suitable carriage or carrier whereby the assembly, disassembly and repair of the operating parts is facilitated.

Another object is to provide a valve which even when subjected to considerable pipeline pressure strain thus causing the seats to be forced out of alignment, and even though the seating surfaces may be irregular with respect to either taper or seating arrangement, will nevertheless be capable of closing in a tight and leak-proof manner.

A principal object of my invention lies in the provision of vertically extending guide ribs within the body which cooperate wtih lugs or ears extending from the edges of the discs or closure members to positively prevent the discs from contacting the seats until the discs and seats are in concentric alignment with each other.

It is generally recognized among those who are skilled in the art of valves that the best seat and disc combination is a relatively soft and resilient material pressed against a harder material whereby the softer material will absorb any abrasive constituents which may ordinarily become lodged between the seating surfaces. Scratching or tearing might easily result upon the seating surfaces if both are made of metal or other relatively hard material. The softer material lends itself flexibly to any scratches, warped portions, or other imperfections in the harder surface thereby promoting the maintenance of a tight fluid seal for a long period of time. Such a seating combination has long been utilized in globe valves and the like, the disc being made of a rubber base compound composition or the like operatively contacting a seat of metal, usually brass or iron. Such a combination, of course, would not be workable or practical in ordinary double disc gate valves because of the line pressure forcing the outlet disc against its downstream seat and thus cause the rubber-like material to be sheared off or torn beyond usefulness when dragged across the seat.

To utilize such desirable hard-soft seating combination in a gate valve it is necessary to construct the valve so the seating surfaces are never rubbed across one another while in pressed contact; instead, when the discs are moved from the seated to the open position, they must first retract positively and substantially toward one another until out of contact with their seats before moving transversely thereto to the open position. Likewise, in closing, the same necessity exists for maintaining the discs out of contact with the seats until in substantial alignment with one another.

Constructions alleged to function in this manner have already been made by many individuals, as the list of granted patents and other literature on the subject show, but to my knowledge, no one previously has been successful in constructing a simple and practical double disc gate valve in which the outlet discs would positively retract against fluid pressure before rising in the opening movement of the valve and yet be rugged and relatively simple and economical to manufacture. In the past a fact that has been entirely overlooked is that tremendous force is exerted on the outlet disc by even moderate fluid pressures. As a consequence, prior constructions sometimes appeared to be workable on paper or in theory but when such structures were actually made and tested in a fluid line carrying substantial pressure, this pressure prevented the theoretical retraction of the outlet disc from its seat prior to transverse movement and therefore sheared off or otherwise injured any rubber seating material used on either face. For instance, the force exerted on the disc of a standard 6-inch gate valve by a nominal fluid pressure, such as one hundred pounds per square inch, is well in excess of a ton and a half.

Specifically, to make the gate valve workable as described under substantial line pressures, I have provided a double disc gate valve with lugs extending outwardly of the discs and which extend beneath appropriate body guides when in the fully seated position. These lugs and therefore the discs must be retracted from beneath the body guides before it is possible to lift the closure member containing the discs across the body seats. To achieve this positive and substantial retraction I also provide the closure member with a novel retracting means as hereinafter disclosed in greater detail.

A further object of my invention is to provide a double disc gate valve device with means for positively applying sufficient seating and unseating loads normally to the seating surfaces in combination with means for positively preventing transverse movement of the seating surfaces while in contact therewith whereby, if desired, a soft, resilient and relatively fragile seating material may be employed to advantage on one or both seating surfaces; or, if metallic seating surfaces are used, galling will be prevented.

Further objects and advantages will become more readily apparent upon proceeding with the following detailed description in connection with the accompanying drawings, in which Fig. 1 is a vertical partially sectional view of a double disc gate valve embodying my invention.

Fig. 2 is a vertical partially sectional magnified view of such a valve taken transversely to the valve seats or at right angles to the view described in connection with Fig. 1.

Fig. 3 is a vertical fragmentary sectional view of the closure member.

Fig. 4 is a sectional view of the closure member taken on the line 4—4 of Fig. 3.

Fig. 5 is a sectional view of the closure member taken on the line 5—5 of Fig. 3.

Fig. 6 is a fragmentary external view of the closure member showing the discs spaced apart as in the seated position.

Fig. 7 is a rear view of one of the discs in perspective.

Fig. 8 is a similar view showing the wedging means.

Similar reference numerals refer to similar parts throughout the various figures.

Figure 1:
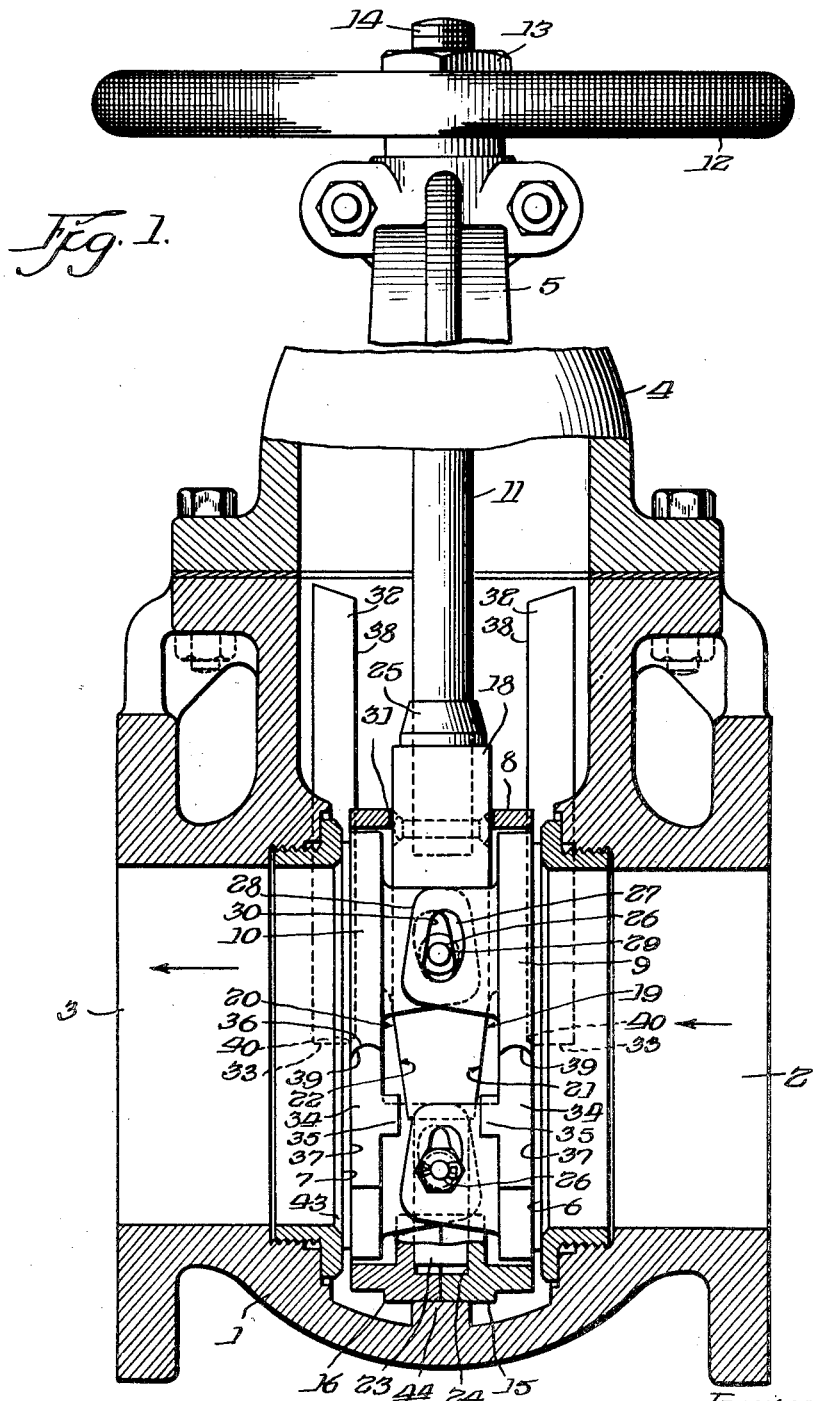

Referring generally to Fig. 1, one modification of my invention is shown as it would be advantageously employed in a parallel seat double disc gate valve. Of course, my device may readily be adapted to other types of valves. The valve comprises the usual body or casing generally designated 1 having an inlet 2, an outlet 3, a bonnet 4, a yoke member 5, body seats 6 and 7 which may be either removable, as shown, or else may be integral with the casing, a guided closure member housing generally designated 8 having positioned therewithin the inlet disc 9 and the outlet disc 10, a stem 11 connected at its lower end to the closure member housing and at its upper end to suitable reciprocating means as, for instance, the handwheel 12, which turns the internally threaded yoke sleeve 13 (yoke threads not shown). The latter member in cooperative relation with the upper threaded portion 14 of the stem 11 causes the stem and closure member housing to reciprocate up or down as the case may be. The ends of the casing are suitably formed, as at 2 and 3, to be attached into a pipeline. While flanged means are shown, any suitable means may be utilized, as for instance, pipe threads, weld ends and the like. While for purposes of description here I have specified the flow as moving through the valve from 2 to 3, the flow, or the valve may optionally be reversed and in the event of such an alternative the valve will still operate in the same advantageous manner.

For convenience of description, my invention may be divided into the combination of three cooperating groups of parts:

I.—The expanding mechanism for telescoping or spreading the discs 9 and 10 apart, against the seats, as in the final seating operation, II.—The retracting mechanism for telescoping or drawing the discs 9 and 10 together, preparatory to lifting the closure member out of the flow (opening the valve), III.—Mechanism for positively preventing the discs from moving transversely to the seats except when out of contact therewith.

The closure member housing already generally designated 8 is constructed preferably of two identical halves 15 and 16 held together by means of the bolts 17. Referring now to Figs. 3, 7 and 8, the expanding mechanism consists of the wedge member 18 connected axially to the lower end of the stem 11 by threads, pins or other suitable means or else being integral therewith, if desired, and having the inclined faces 19 and 20 in contact with similarly inclined faces 21 and 22 integrally cast on the rear surfaces of the discs 9 and 10. The lower end portion 23 of the wedge member 18 comprises an axial cylindrical guide section adapted to fit slidably within the hollow cylindrical portion 24 of the bottom of the closure member housing 8. At the upper end of the wedge member 18 and resting thereon slidably surrounding the stem 11 is an annular-shaped back-seating disc 25 adapted to cooperate with a suitable seat in the upper part of the bonnet 4 (seat not shown) to provide a leak-proof seal when the stem is lifted to its fully open position whereby the packing (not shown) may be renewed without removing the valve from service.

The retracting mechanism consists of the two rods 26 positioned within the wedge member 18 as shown in Fig. 8. These rods 26 are normally positioned within the slots 27 in the rearwardly extending lugs or ears 28 of the discs. The inclined faces 29 of the rods 26 also normally are in contact with the similarly inclined inside surfaces 30 of the lugs 28 as in Figs. 1 and 3. Thus, when the stem 11 is lifted vertically, the wedge member 18 moves upwardly through the opening 31 in the closure member housing 8 and the rods 26 being connected to it move upwardly with it. This arrangement causes the inclined surfaces 29 to come into positive contacts with the disc surfaces 30 and, since the disc movement is vertically restrained by the closure member housing, the discs can move only axially and are thereby retracted to the extent of being out of contact with the body seats 6 and 7.

In order to positively prevent the discs from moving upwardly with the stem while the discs 9 and 10 are still in contact with the body seats 6 and 7, and to positively maintain the discs and seats in this desirable spaced-apart relation at all positions other than the seated position, the body is preferably provided with four vertically extending guide ribs 32, the bottom 33 of each rib terminating at the horizontal centerline of the valve in the modification illustrated. Obviously, the exact termination of the guides 32 is a matter of choice and will perform substantially the same function wherever located. The valve discs are provided with the lugs 34 projecting from each side, the closure member housing 8 being recessed, as shown more clearly in Fig. 6, to accommodate them. The lugs 34 are preferably provided with strengthening fins 35, although, of course, their use is a matter of individual choice.

In the seated position of the valve, the lugs 34 are located beneath the lower end of the body guides 32 and are spread or wedged apart as in Fig. 6 toward the body seats by the movement of the wedge surfaces 19 and 20 against the inclined disc surfaces 21 and 22 as already described. Thus to unseat and open the valve, the handwheel 12 is suitably rotated causing the stem 11 and the wedge block 18 to move axially upwardly. The closure member housing 8 and the discs are prevented from following immediately because of the abutment of the upper surfaces 36 of the lugs 34 with the lower surfaces 33 of the body guides 32. As the wedge block 18 moves upwardly within the housing 8, it carries the rods 26 upwardly also thereby causing the surfaces 29 to retract the discs 9 and 10 toward one another and sliding the edges 33 and 36 across one another until the outside surfaces 37 of the lugs 34 are in substantial alignment with the inside surfaces 38 of the body guides 32. At this stage of operation the corners 39 of the lugs 34 will move upwardly around the corners 40 of the body guides 32. Stress concentration will be high at this point especially on the outlet lug and guide corners, due to the fluid pressure acting against the outlet disc causing the corners 39 when on the outlet side to be pressed axially against the corresponding corners 40. The lifting forces transmitted through the stem cause these same corners 39 also to be forced upwardly against the corners 40.

Consequently, the corners 39 and 40 are preferably rounded to reduce the stress concentration at this position and to reduce wear. After the lugs round the corner the entire closure member assembly is lifted out of the path of fluid flow being guided in its upward travel by the vertically extending housing guides 41 within the body which fit slidably into the longitudinal recesses or channels 42 of the housing 8. It will become apparent that as the closure member is lifted, the lug faces 37 are maintained in contact with the surfaces 38 of the body guides 32, thereby maintaining the rubber, composition or metal disc seating rings 43 out of contact with the body seat or body seat rings. In closing the valve, the operations are carried out exactly as described except in the reverse manner, the wedging member 18 moving downwardly within the housing 8 as soon as the latter member comes into arresting abutment with the bottom portion of the casing, such as the boss 44.

Thus it will be apparent that I have devised in a relatively simple manner a double disc gate valve having discs which will positively move away from the seats before the valve can be opened, thereby eliminating the possibility of galling when metal seating surfaces are used and making it commercially feasible for the first time to produce a double disc gate valve with rubber, composition or the like sealing surfaces on disc or seat surfaces having the particular advantage of making an absolutely dependable leak-proof seal within the valve.

While a single preferred embodiment of my invention has been described, it should be readily understood that my invention is capable of embodiment in a variety of modifications. Therefore, changes in the construction and in the arrangement of the various parts may be made without departing from the spirit or the scope of the invention as determined by the claims appended hereto.

I claim:

1. A valve comprising a casing having a fluid passageway, inlet and outlet seats, a closure member for said passageway, an operating stem for the said closure member having inclined portions thereon, the said closure member comprising a common housing and a pair of axially movable discs assembled within said common housing, the said common housing being reciprocably movable within the said casing, a portion of the said stem engaging the said housing and having each inclined portion thereon cooperating with a similarly inclined centrally located portion on the back of one of said discs, whereby the said discs are pressed into fluid sealing contact with said seats when they are in axial alignment therewith and upon the occurrence of downward movement of said stem with respect to said housing, each of said discs having recessed portions thereon, the said stem having a lower extension with inclined surfaces thereon cooperating with similarly inclined portions formed within the recessed portions, each of said discs having a projection on each opposite edge thereof extending substantially beyond the periphery thereof, the upper face portion of each of which is in substantial axial alignment with the axis of the said discs, guide means within the said casing extending down to and terminating in proximity to the upper face portions of each of said projections when the said discs are in the seated position whereby while the upper face portions of each of said disc projections are in contact with the lower end faces of the said body guide means the said projections and guide means cooperate with the inclined portions of said stem and the inclined portions on the back of each disc to move said discs outwardly in axial relation to said seats at predetermined seating and draw the said discs from contact with said seats preliminary to opening the valve.

2. A valve comprising a casing having inlet and outlet seats, a closure member therefor, an operating stem for the said closure member and having an axial extension, the said closure member comprising a housing and a pair of axially movable discs assembled telescopically within said housing, a thickened portion on the axial extension of said stem having end wedge surfaces, each of the latter surfaces cooperating with a similar wedge surface on the back of each one of said discs, both of said stem wedge surfaces forcing the said discs into fluid sealing engagement with the seats in the valve casing when in substantial alignment therewith simultaneous with downward axial movement of the stem relative to the said housing, rod means attached to the stem within said housing and extending into oblique slots formed in rearward extensions of said discs whereby upward movement of the said stem relative to the said housing draws the said discs together, each of said discs having extensions on each opposite edge extending substantially beyond the periphery thereof, vertical guides within said casing cooperating with the said disc extensions to engage the upper surfaces of the latter at predetermined positions of the discs whereby upon upward opening movement of said stem, the movement of the said discs is initially restrained to a substantially axial direction.

3. A valve comprising a casing having a fluid passageway, inlet and outlet seats, a closure member for said passageway, an operating stem for the said closure member, the said closure member comprising a common housing and a pair of axially and telescopically movable discs assembled within said common housing, the said common housing being reciprocably guided within the said casing, a portion of the said stem extending into said housing and having oppositely disposed inclined surfaces therein, each cooperating with a similarly inclined centrally located surface on the back of each one of said discs, whereby the said disc are pressed into fluid sealing contact with said seats when they are in axial alignment therewith and upon the occurrence of downward movement of said stem with respect to said housing, the back of each one of said discs having slotted bosses thereon, the said stem having within said housing perpendicular rod-like extensions with inclined surfaces thereon and cooperating with similarly inclined surfaces formed within the slots of each one of said bosses, whereby on upward movement of the said stem with respect to said housing the said discs are telescoped inwardly and out of contact with said seats, each of said discs having a projection on each edge thereof extending substantially beyond the periphery thereof, the upper face portion of each projection of which is in substantial axial alignment with the axis of the said discs, longitudinal guides within said casing extending down to and terminating in proximity to the upper surface portions of each of said projections to engage the said surface portions when the said discs are in the seated position whereby said projections and guides cooperate with the inclined surfaces of the stem and the discs to maintain said discs in axial relation to said seat when in contact therewith and further upon releasing said engagement between said disc projections and casing guides to maintain said discs out of contact with said seat when in any other than in substantially axial relation thereto.

4. A valve comprising a casing having a fluid passageway, inlet and outlet seats, a closure member for said passageway, an operating stem for the said closure member, the said closure member comprising a substantially cylindrical housing and a pair of axially and telescopically movable discs within said housing, the said housing being reciprocably guided within the said casing, a portion of the said stem having oppositely disposed wedge surfaces thereon, each one of the latter surfaces cooperating with a similar surface on the back of each one of said discs, whereby the said discs are moved axially into fluid sealing contact with said seats upon downward movement of said stem relative to said housing, each of said discs having slotted bosses thereon, the said stem portion having within said housing perpendicular rod-like extensions cooperating with inclined surfaces formed on the disc bosses, whereby on predetermined movement of the said stem relative to the said housing the said discs are moved out of contact with said seats, each of said discs having means in substantial axial alignment with the axis of the said discs, a longitudinal guide within said casing extending down to and terminating in proximity to the said latter disc means for engagement therewith when the said discs are in the seated position whereby said disc means and guides cooperate with the wedge surfaces of the stem and the similar surfaces on the back of each disc to maintain said discs in axial relation to said seat when in contact therewith and further allowing for the rod-like extensions of the stem to engage the inclined surfaces on the disc bosses to maintain said discs out of contact with said seat when in any other than in substantially axial relation thereto.

5. A valve comprising a casting having inlet and outlet seats, a closure member therefor, actuating means for the said closure member including an axial extension therefor, the said closure member including a housing cooperating with said actuating means and having a pair of axially movable discs longitudinally movable relative to the said housing, wedge means within said housing mounted on the axial extension of said actuating means, complementary wedge means located on a rearward face of each of said discs cooperating with said first named wedge means to move each of said discs axially with relation to the said valve seats when in substantial alignment therewith simultaneously with predetermined downward axial movement of the actuating means relative to the housing, a plurality of means within the said casing for contracting the said discs cooperating with said actuating means contained within the said housing and extending into recesses formed in the rear portion of each of said discs, each of the said discs having means on each opposite edge thereof overlapping and cooperating with vertical guide means within the said casing in the lowered position of the closure member for predeterminately holding the said latter mentioned disc means against transverse movement whereby upon upward movement of the said actuating means, the movement of said discs is initially limited to a substantially axial direction by the engagement of the said disc means with the said vertical guide means.

CHESTER W. YANT.

REFERENCES CITED

The following references are of record in the file of this patent:

UNITED STATES PATENTS

| Number | Name | Date |
|---|---|---|
| 791,173 | Anglim | May 30, 1905 |
| 869,525 | Schutte | Oct. 29, 1907 |
| 1,057,308 | Watson | Mar. 25, 1913 |
| 1,136,841 | Shaw | Apr. 20, 1915 |

FOREIGN PATENTS

| Number | Country | Date |
|---|---|---|
| 82,802 | Sweden | Mar. 5, 1935 |
| 267,052 | Germany | Nov. 8, 1913 |
| 556,652 | Germany | Aug. 12, 1932 |
| 636,317 | Germany | Oct. 6, 1936 |

Certificate of Correction

Patent No. 2,502,689 April 4, 1950

CHESTER W. YANT

It is hereby certified that error appears in the printed specification of the above numbered patent requiring correction as follows:

Column 8, line 17, for the word "casting" read *casing*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*